Patented Jan. 22, 1952

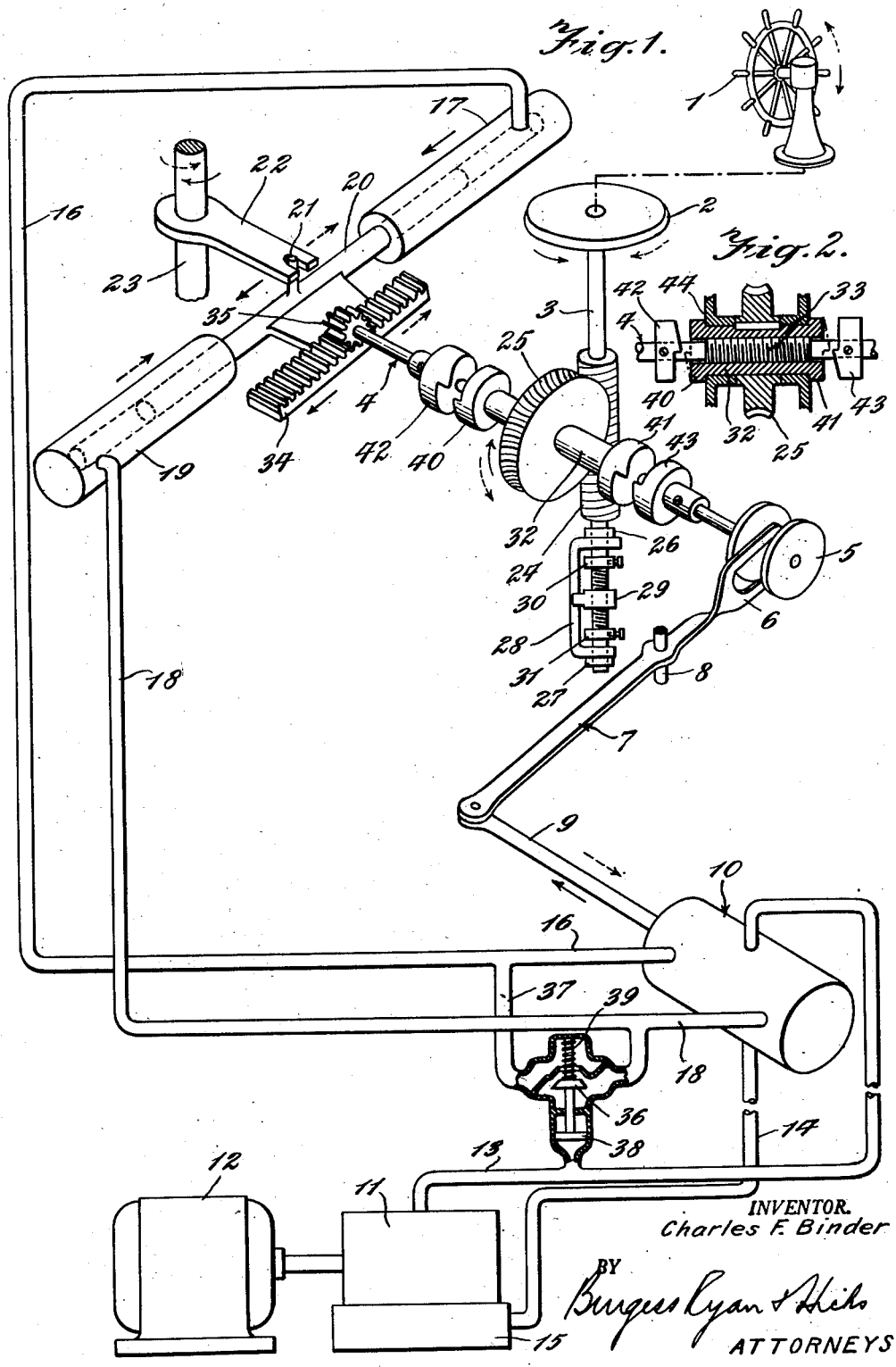

2,583,407

UNITED STATES PATENT OFFICE 2,583,407

POWER STEERING MECHANISM

Charles F. Binder, Cranford, N. J., assignor to Lidgerwood Manufacturing Company, Elizabeth, N. J., a corporation of New York Application December 12, 1945, Serial No. 634,475

7 Claims. (Cl. 74—625)

This invention relates generally to so-called power steering mechanism, by which is meant steering mechanism which is directed by the manual manipulation of a steering wheel, or the like, which controls a power source adapted to apply the actual steering force.

The primary object of the invention is a steering mechanism of the foregoing character which incorporates novel provisions for maintaining control in the event of failure of the power supply. More particularly, the invention provides for such control to be maintained automatically, that is, in the sense of requiring no conscious attention by the operator or helmsman, the manual manipulation of the steering wheel being effected just as before and the steering then being effected manually, all without any adjustment of parts or controls of any kind. Similarly, the invention provides for the automatic restoration of power steering as soon as the power is restored and, again, without requiring the adjustment of any controls or even any conscious attention by the man at the wheel.

With the foregoing and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby will be readily understood by those skilled in the art.

In the drawings, Fig. 1 is a diagrammatic, partly perspective rendering of a complete installation embodying the invention and Fig. 2 is a sectional view of a detail.

The installation shown in the drawing and described herein for purposes of illustration is of a character commonly employed in ship steering and many of the components will be recognized as being of standard construction.

In such installation, steering is effected either by a deck house wheel 1 or, below deck, by a so-called trick wheel 2, both of which serve to rotate a shaft 3 which in turn, through some suitable transmission, serves to effect axial movement in one direction or the other of a shaft generally designated 4. Such axial movements of shaft 4 are utilized to control the power source by which the steering mechanism is actuated, that is to say, by which the rudder itself is moved in response to rotation of the wheels 1 or 2.

As diagrammatically illustrated, the right hand end of shaft 4 carries a grooved wheel 5, which is engaged by the forked end 6 of a lever 7 pivoted on a stud 8 and coupled to a rod 9 which serves to control the power source. In this instance, and as is commonly the case, the power utilized is hydraulic and, accordingly, the rod 9 serves to control a valve generally designated 10. Valve constructions suitable for the purpose are well known and require no detailed illustration or description. As usual in hydraulic systems of this general character, a pump 11, driven by motor 12, supplies liquid under pressure through line 13 to the valve; and a return line 14 leads from the valve to a sump 15 adjacent the pump. As is well understood, the pump circulates liquid to the valve and back to the sump when the steering mechanism is idle, but in response to movement of rod 9, the valve is manipulated to direct liquid under pressure either through line 16 to cylinder 17 or through line 18 to cylinder 19. At the same time, of course, the valve line, which is not connected to the high pressure side of the system, is vented back to the sump. A ram 20 is mounted for reciprocation in the cylinders, and moves to the right or to the left according to whether the valve admits high pressure liquid to cylinder 19 or to cylinder 17, and, in so moving, the ram serves to swing arm 22 (as through stud 21) and so rotate what may be considered to be the rudder post 23. All of the foregoing may be of standard or any preferred construction.

It is also common in such installations to provide a so-called follow-up mechanism by means of which the control valve 10 is restored to a median position at the termination of each movement of the steering wheel, thereby making the rudder post movements proportional to the steering wheel movements. Such a follow-up mechanism is contemplated in the present installation and certain elements of such mechanism are preferably utilized to provide the automatic change-over from power to hand steering, as later described.

Mounted on shaft 3 is a worm 24 which meshes with a worm wheel 25. It will be understood that shaft 3 is held against axial movement, as by means of collars 26, 27 secured to the shaft and abutting a fixed bracket 28. A threaded collar 29, mounted on a threaded section of shaft 3, is held against rotation by engagement with bracket 28, and in its upward and downward movements comes into engagement with fixed collars 30 and 31, and thereby serves to limit the permissible rotation of shaft 3.

As shown more particularly in Fig. 2, worm wheel 25 is keyed to an internally threaded sleeve 32 which is suitably held against axial movement. The shaft 4 extends clear through sleeve 32 and has a threaded section 33 engaged in the sleeve. It will be understood that by reason of the foregoing construction, rotation of wheels 1 or 2 serves to rotate worm wheel 25 and sleeve 32 and, through the threaded engagement of shaft 4 with the sleeve, to effect the above-mentioned axial movement of shaft 4, thereby controlling valve 10 and power-manipulating the rudder post to right or to left according to the direction in which the wheel 1 or the wheel 2 is rotated. For convenience in following the operation of the mechanism, two series of arrows have been applied to the various elements, the full line arrows indicating "left rudder" action and the broken line arrows indicating "right rudder" action.

The follow-up mechanism referred to above includes a rack 34 secured to, or otherwise arranged to partake of the endwise movements of, ram 20; and, meshing with the rack, is a pinion 35 secured to the left hand end of shaft 4. The rack and pinion teeth are of such width as to remain in mesh through the axial movements of shaft 4.

It will now be apparent that when wheel 2 is rotated for left rudder, for example, the resulting rotation of sleeve 32 is in a direction to move shaft 4 axially to the right, thereby operating valve 10 to admit liquid under pressure to cylinder 17, and causing ram 20 to move to the left. This, of course, rotates rudder post 23 in the direction of the full line arrow. Coincidently with such movement of ram 20 to the left, rack 34 also moves to the left, and in so doing rotates pinion 35 and shaft 4. The direction in which the shaft 4 is thus caused to rotate is clockwise, as viewed from the right hand end of the shaft, and such rotation causes the shaft to move bodily to the left (due to the threaded engagement of the shaft with sleeve 32). It will be observed that such axial movement of the shaft is in a direction opposite to that in which it was caused to move by the initial rotation of wheel 2, and such opposite movement therefore acts through lever 7 to restore valve 10 to its median or inactive position.

According to the present invention, provision is made for utilizing the rotation of sleeve 32 and the axial movements of shaft 4 to apply direct manual steering to the rudder post, through the follow-up pinion and rack, whenever for any reason the power fails. To this end means is provided for short-circuiting the cylinders 17, 19 to permit free flow of liquid from one to the other during manual steering, regardless of the position of valve 10. In this instance, such means is shown as consisting of a valve 36 which controls a line 37 connecting high pressure lines 16 and 18. Valve 36 is normally held closed by pressure liquid from line 13 acting on piston 38, but in the event of power failure and consequent failure of liquid pressure, the valve is moved to its open or short-circuiting position by spring 39. The open valve 36 thus by-passes valve 10, so that even though the valve 10 be in its medium position, ram 20 will be freely movable.

Secured to the ends of sleeve 32 are oppositely arranged clutch drive members 40 and 41 and secured to shaft 4 adjacent these drive members are corresponding driven members 42 and 43. The end faces of sleeve bearing 44, lying adjacent the proximate faces of the drive members 40, 41, serve to hold the sleeve against axial movement. The driven members 42, 43 are normally spaced from their respective drive members, i. e. when the mechanism is at rest.

Notwithstanding the provision of these two clutches, the ordinary power operation of the mechanism proceeds just as already described. For left rudder, for example, as already noted, one of the steering wheels is rotated in the direction of the full line arrow, the shaft 4 is thereby moved axially to the right, and, through the power drive, ram 20 is moved axially to the left. Such axial movement of shaft 4 will be seen to cause driven member 42 to move toward engagement with its already rotating drive member 40; but the movement of the ram, acting through rack 34 and pinion 35, rotates shaft 4, as already described. The direction of such rotation of shaft 4 is the same as that in which the drive member 40 is then rotating, with the result that the driven member, instead of standing idle waiting to be driven by member 40, runs ahead of it. Also, as already described, such rotation of shaft 4 is in a direction to cause it to move axially to the left (the opposite direction to that in which the shaft is moved manually); and such movement of the shaft to the left will be seen to draw the driven member 42 away from its drive member 40. The same general sequence results from rotation of one of the steering wheels for right rudder, except, of course, that the clutch members 41 and 43 are involved and the several directions of movement of the various elements are reversed. Generally stated, the net of all this is that the power drive means countermands or off-sets the clutch-coupling action which tends to follow the manual manipulation of one or the other of the steering wheels. The manual means operates to move one or the other of the clutch elements toward engagement and the power means (which is itself responsive to manipulation of the manual means) operates to maintain the clutches disengaged.

From the foregoing, the sequence of operations which occurs when the power fails will be apparent. In such event, the power means simply fails to prevent the engagement of that clutch which, at the time, is moving toward engagement. In the left rudder sequence already described, for example, manual manipulation of wheel 1 or wheel 2 will move shaft 4 axially to the right and, in so doing, cause clutch member 42 to approach the rotating clutch member 40. In this instance, assuming the power has failed, the resulting manipulation of valve 10 is wholly ineffective; and consequently no power is applied to actuate the ram and the follow-up rack. Accordingly, clutch drive member 40 becomes fully engaged with driven member 42 and thereupon proceeds to rotate shaft 4. The direction in which shaft 4 is thus caused to rotate (manually, now) is the same as that in which worm wheel 25 is rotating; and hence pinion 35 drives the rack 34 and ram 20 to the left and swings arm 22 in the required direction, i. e. for left rudder.

Obviously now, this whole sequence just described occurs without any conscious attention by the man at the wheel. The change-over from power to manual steering is thus wholly automatic, whether the power failure results from failure of the electrical supply to motor 12, or of the motor itself, or from breakage or leaks in the liquid lines. In any such event, and regardless of whether the man at the wheel is aware of such failure, manual manipulation of the steering wheels is effective to rotate the rudder post and maintain control of the vessel. It will also be apparent now that the precise instant when either of the clutches becomes fully engaged and shaft 4 actually driven by either of the clutch members 40, 41 depends upon the initial clearance established between the clutch member faces, which clearance need be no more than sufficient to insure that clutch engagement does not occur before the follow-up mechanism has had time to function.

It will be understood that, due to the worm drive, all-manual steering will be somewhat slower than normal power steering; and the result of this is that when the power is restored, the ensuing power rotation of shaft 4 (through the rack 34 and pinion 35) serves to clear or disengage the clutches by causing whichever of the driven members is then operating to over-run its slower (manually rotated) drive member.

By "normal" power steering is meant steering throughout all usual conditions. If the rudder happens to be subject to some unusual load, the power steering may be slowed up, but no untoward result follows. If the action is slowed to an extreme, the follow-up mechanism may not function rapidly enough to keep the clutches wholly disengaged, but in such event, the only result is that the action becomes a combination of manual and power steering. Under all conditions, due to the maintenance at all times of control by the steering wheels, whether steering by hand, by power or by a combination of them, the apparatus will be seen to function to keep the rudder in synchronism with the usual pilot house indicator.

It will be apparent that without departing from the principles of this disclosure, the invention can be embodied in various forms to meet the needs of particular installations. In the light of the foregoing description of this one illustrative embodiment of the invention, the following is claimed:

1. In a steering mechanism of the character described, the combination of a rotatable, internally-threaded sleeve, means for holding the same against axial movement, an axially movable rotatable shaft extending through the sleeve and having a threaded section engaged therein, oppositely arranged clutch drive members secured to the opposite ends of the sleeve, a clutch driven member secured to the shaft adjacent but normally spaced from each of the clutch drive members, whereby axial movement of the shaft in response to rotation of the sleeve simultaneously advances one of the driven members toward and the other driven member away from its adjacent drive member, manual means for rotating the sleeve, and power means, normally responsive to movement of the shaft in one axial direction, adapted to rotate the shaft in the sleeve in a direction to cause the shaft to move in the opposite axial direction.

2. In a steering mechanism of the character described the combination of a rotatable, internally-threaded sleeve, means for holding the same against axial movement, an axially movable rotatable shaft having a threaded section engaged in the sleeve, two drive members connected to the sleeve, a driven member secured to the shaft adjacent each of the drive members, whereby axial movement of the shaft in response to rotation of the sleeve simultaneously advances one of the driven members toward and the other driven member away from its adjacent drive member, manual means for rotating the sleeve, and power means, normally responsive to the resulting movement of the shaft in one axial direction, adapted to cause the shaft to move in the opposite axial direction.

3. In a steering mechanism of the character described, the combination of a pair of clutches, connecting means between elements of both clutches including a shaft axially movable in either direction to engage one and disengage the other clutch, manual means for moving the shaft axially, power means adapted to be activated by axial movement of the shaft, and means actuated by the power means adapted to move the shaft axially in a direction opposite to that effected by said manual means.

4. In a steering mechanism of the character described, the combination of a rotatable drive member and a rotatable driven member normally disconnected therefrom but axially movable into engagement with the drive member, manually operable means for rotating the drive member, power drive means, means responsive to rotation of the drive member adapted to move the driven member axially toward engagement with the drive member and, coincidently, to activate said power drive means, and means actuated by the power drive means to move the driven member axially away from engagement with the drive member.

5. In a steering mechanism of the character described, the combination of a drive member and a driven member normally spaced and disconnected therefrom, one of said members being movable in one direction to effect coupling with the other member and in the opposite direction to maintain the spacing of said members; power means for moving said one member in said other direction for maintaining said spacing; control means movable in opposite directions for starting and stopping said power means; manual means for moving said one member in said one direction; and connections between the manual means and the control means adapted to move the latter in a direction to start the power means.

6. In a steering mechanism of the character described, the combination of a pair of clutches, each including an axially movable element, connections between said axially movable elements, manual operating means for said connections movable in a direction to engage one and disengage the other clutch, power means, a control element for the power means, actuating means for the control element coupled to said connections for actuation in response to said manual movement of said connections and means operated by said power means for moving said connections in the opposite direction to disengage said one clutch.

7. In a steering mechanism of the character described, the combination of a pair of clutches, manually operable means movable in opposite directions, alternatively, to engage one and disengage the other clutch, power means movable in opposite directions, alternatively, to disengage said one and engage said other clutch and connections from the manual means for activating the power means.

CHARLES F. BINDER.

(References on following page)

REFERENCES CITED

The following references are of record in the file of this patent:

UNITED STATES PATENTS

| Number | Name | Date |
|---|---|---|
| 13,626 | Lark et al. | Oct. 25, 1856 |
| 329,244 | Walter | Oct. 27, 1885 |
| 567,327 | Volker | Sept. 8, 1896 |
| 1,120,663 | Baker | Dec. 15, 1914 |
| 1,513,530 | Bliss | Oct. 28, 1929 |
| 2,105,473 | Dean | Jan. 18, 1938 |
| 2,152,914 | Price et al. | Apr. 14, 1939 |
| 2,266,237 | Newell | Dec. 16, 1941 |
| 2,384,044 | Poorman | Sept. 4, 1945 |

FOREIGN PATENTS

| Number | Country | Date |
|---|---|---|
| 3,917 | Great Britain | Feb. 15, 1915 |
| 155,662 | Germany | Nov. 17, 1904 |